UNITED STATES PATENT OFFICE.

ZENO OSTENBERG, OF SAN JOSE, CALIFORNIA, ASSIGNOR TO INTERNATIONAL CELLULOSE COMPANY, OF RENO, NEVADA, A CORPORATION OF NEVADA.

PROCESS OF DISSOLVING CELLULOSE.

1,348,731.     Specification of Letters Patent.     Patented Aug. 3, 1920.

Original application filed January 31, 1916, Serial No. 75,356. Patent No. 1,218,954, dated March 13, 1917. Divided and this application filed November 1, 1916. Serial No. 128,962.

*To all whom it may concern:*

Be it known that I, ZENO OSTENBERG, a citizen of the United States, and resident of San Jose, in the county of Santa Clara and State of California, have invented a certain new and useful Improvement in Processes of Dissolving Cellulose, of which the following is a specification.

My invention relates to the process of producing solutions of cellulose by dissolving cellulose in suitable mixtures of hydrochloric and sulfuric acids, or hydrochloric and phosphoric acids, this application being a divisional application of my Patent No. 1,218,954, March 13, 1917.

The use of highly concentrated hydrogen chlorid solution in the process of dissolving cellulose renders that process somewhat expensive, and the use of the gas to form the concentrated acid renders the process inconvenient, complicated, undesirable and expensive. In my improved process I obviate the necessity of using hydrogen chlorid in the gaseous form by substituting therefor concentrated sulfuric or phosphoric acid.

Hydrochloric acid of a lower concentration than the acid of commerce (35.5% to 37.5% HCl) may be utilized in the same way by the addition of sufficient concentrated sulfuric acid. In fact acids ranging in concentration from 25% HCl to 39% HCl have been utilized by me. Solutions of cellulose up to 17% in concentration may be obtained by dissolving the cellulose in the proper acid mixture. The greater the concentration of hydrochloric acid the greater is the amount of cellulose dissolved. The solutions obtained are useful in the arts and sciences since the cellulose may be recovered in a number of ways or it may be allowed to hydrolize and the glucose formed by hydrolysis may be recovered or fermented to alcohol. The mode of application of these acid mixtures is varied depending on the result desired.

The following examples are merely illustrative and in no way are to be understood as limiting my patent but will serve to make clear some of its uses. The acid mixtures are made by mixing concentrated acids of commerce in vessels supplied with suitable means for cooling. In utilizing hydrochloric acid of commerce for producing a solvent for cellulose I have found that 1½ parts of concentrated sulfuric acid is approximately equivalent to 1 part of hydrogen chlorid when dissolved in the commercial hydrochloric acid.

Example 1: One kilogram of air-dried cotton is kneaded with about six kilograms of a mixture of 9 parts hydrochloric acid (37% HCl) and 1 part of concentrated sulfuric acid by weight. If hydrogen chlorid should escape the solution is suitably cooled. A thick viscid mass results which may be clarified and then forced through orifices into a suitable coagulating fluid, as water, dilute acid, solutions of various salts and various other media.

Example 2: Comminuted wood is intimately mixed with a sufficient quantity of a 1 part concentrated sulfuric acid—9 parts hydrochloric acid (37% HCl content) mixture so that the amount of water present does not exceed one-fifth of the weight of cellulose or cellulose derivatives present in the wood. A portion of the cellulose dissolves and hydrolyzes at room temperature and more cellulose goes into solution and this also hydrolyzes until finally all of the cellulose is converted into dextrose (glucose). A considerable amount of the water is used up in the process and this causes a disengagement of hydrogen chlorid. As much as possible of the hydrogen chlorid is recovered directly, the mass extracted by a suitable solvent, as water, and the remainder of the acid removed as completely as possible by osmosis. The solutions of sugars (dextrose and pentoses) may then be used in the arts.

Example 3: ½ kilogram of comminuted wood is kneaded with about six kilograms of a mixture of 9 parts hydrochloric acid (37% HCl) and 1 part of concentrated sulfuric acid by weight. If hydrogen chlorid should escape the solution is suitably cooled. A thick viscid mass results from which the lignin is filtered off and then forced through orifices into a suitable coagulating fluid, as water, dilute acid, solutions of various salts and various other media.

In the term "cellulose" is included the so-called oxycelluloses and hydrocelluloses and ligno-cellulose. Lignin is insoluble in the acid mixture used and is left undissolved when such material as wood is used as a cellulose containing material.

I claim:

1. The process of dissolving cellulose in a mixture of concentrated hydrochloric acid and concentrated sulfuric acid at a temperature below 50° C.

2. In the process of dissolving cellulose in highly concentrated hydrochloric acid the replacement of part of the hydrochloric acid by sulfuric acid at a temperature below 50° C.

3. The process of dissolving cellulose in a mixture of hydrochloric acid and sulfuric acid with an initial amount of water not to exceed one-fifth of the weight of the cellulose at a temperature below 50° C.

4. In the process of dissolving cellulose in highly concentrated hydrochloric acid the replacement of part of the hydrochloric acid by concentrated sulfuric acid at a ratio of $1\frac{1}{2}$ parts of concentrated sulfuric acid to take the place of one part of hydrogen chlorid at a temperature below 50° C.

In testimony whereof I have hereunto affixed my signature this 26th day of October, 1916.

ZENO OSTENBERG

It is hereby certified that Letters Patent No. 1,348,731, granted August 3, 1920, upon the application of Zeno Ostenberg, of San Jose, California, for an improvement in "Processes of Dissolving Cellulose," were erroneously issued to International Cellulose Company, as assignee of the entire interest in said invention, whereas said Letters Patent should have been issued to *the inventor, said Ostenberg*, as sole owner of said invention; and that the said Letters Patent should be read with this correction therein that the same may conform to the record of the case in the Patent Office.

Signed and sealed this 14th day of September, A. D., 1920.

[SEAL.]

M. H. COULSTON,
*Acting Commissioner of Patents.*

Cl. 127—10.